(12) United States Patent
Kim

(10) Patent No.: US 11,215,824 B2
(45) Date of Patent: Jan. 4, 2022

(54) HEAD-UP DISPLAY DEVICE FOR VEHICLE

(71) Applicant: Hyundai Mobis Co., Ltd., Seoul (KR)

(72) Inventor: Byung Ki Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 213 days.

(21) Appl. No.: 16/533,252

(22) Filed: Aug. 6, 2019

(65) Prior Publication Data

US 2020/0049990 A1 Feb. 13, 2020

(30) Foreign Application Priority Data

Aug. 10, 2018 (KR) .......................... 10-2018-0094049

(51) Int. Cl.
  *G02B 27/01* (2006.01)
  *B60K 35/00* (2006.01)
(52) U.S. Cl.
  CPC .......... *G02B 27/0149* (2013.01); *B60K 35/00* (2013.01); *B60K 2370/1529* (2019.05); *B60K 2370/691* (2019.05); *B60K 2370/816* (2019.05); *B60K 2370/828* (2019.05)
(58) Field of Classification Search
  CPC ........ G02B 2027/0154; G02B 27/0149; G02B 27/01; B60K 2370/1529; B60K 35/00; B60K 2370/67
  See application file for complete search history.

(56) References Cited

U.S. PATENT DOCUMENTS

2018/0101008 A1* 4/2018 Takada ................... G02B 27/01
2018/0180881 A1* 6/2018 Saitou .................... B60K 35/00

* cited by examiner

*Primary Examiner* — Ryan D Howard
(74) *Attorney, Agent, or Firm* — H.C. Park & Associates, PLC

(57) ABSTRACT

A head-up display device for a vehicle may include: a housing mounted in a vehicle; a cover covering an entrance of the housing; a driver mounted in the housing; and a combiner coupled to the driver so as to operate separately from the cover, erected from the inside to the outside of the housing so as to display vehicle information, and replaceably assembled in a latch manner.

12 Claims, 10 Drawing Sheets

HEAD-UP DISPLAY DEVICE FOR VEHICLE

CROSS-REFERENCE TO RELATED APPLICATION

This application claims priority from and the benefit of Korean Patent Application No. 10-2018-0094049, filed on Aug. 10, 2018, which is hereby incorporated by reference for all purposes as if set forth herein.

BACKGROUND

Field

Exemplary embodiments relate to a head-up display device for a vehicle, and more particularly, to a head-up display device for a vehicle, which includes a combiner coupled in a latch manner so as to be rapidly assembled and replaced.

Discussion of the Background

In general, a head-up display refers to a device that displays various pieces of vehicle information as virtual images on the windshield of a vehicle such that a driver can check the vehicle information while continuously staring ahead during driving.

A combiner-type head-up display includes a combiner which is stored in a vehicle and deployed to display vehicle information, if necessary.

In the related art, the combiner and a bracket are fixed by a screw or coupled by an adhesive. However, when the combiner and the bracket are fixed by the screw, the combiner may be deformed by a fastening force of the screw, thereby degrading an optical quality. Furthermore, when the combiner and the bracket are coupled by the adhesive, it is difficult to replace only the combiner. Thus, there is a demand for a structure capable of solving such a problem.

The related art of the present invention is disclosed in Korean Patent Application Laid-Open No. 2009-0088561 published on Aug. 20, 2009 and entitled "Head-Up Display Device for Vehicle".

The above information disclosed in this Background section is only for enhancement of understanding of the background of the invention and, therefore, it may contain information that does not constitute prior art.

SUMMARY

Exemplary embodiments of the present invention provide a head-up display device for a vehicle, which includes a combiner coupled in a latch manner so as to be rapidly assembled and replaced.

Additional features of the invention will be set forth in the description which follows, and in part will be apparent from the description, or may be learned by practice of the invention.

In one embodiment, a head-up display device for a vehicle may include: a housing mounted in a vehicle; a cover covering an entrance of the housing; a driver mounted in the housing; and a combiner coupled to the driver so as to operate separately from the cover, erected from the inside to the outside of the housing so as to display vehicle information, and replaceably assembled in a latch manner.

The combiner may include: a support part mounted on the driver; a display part disposed on a line perpendicular to the support part, and pin-coupled to the support part so as to visually display the vehicle information; and a latch part rotatably mounted on the support part, and locked to the display part to constrain the display part while rotated.

The combiner may further include: a rear cover part fastened to the support part in a snap-fit manner, and covering the outside of the display part; and a front cover part fastened to the support part in a snap-fit manner, and covering the inside of the display part.

The support part may include: a support plate connected to the driver; one or more support pins formed on the support plate, and inserted into the front cover part through the display part; a support central part formed in the center of the support plate, and coupled to the rear cover part in a snap-fit manner; a support side part formed at either end of the support plate, and coupled to the rear cover part in a snap-fit manner; and a support shaft formed in the support side part, such that the latch part is rotatably mounted on the support shaft.

The support central part may include: a central guide formed on the support plate and protruding toward the rear cover part; and a central hook formed on the support plate, and protruding toward the rear cover part so as to be locked and fixed to the rear cover part.

The support side part may include: a side body formed at the edge of the support plate; a side insertion part formed on the side body, such that the rear cover part is inserted into the side insertion part; and a side locking part formed on the side body, such that the rear cover part is locked and fixed to the side locking part.

The display part may include: a display window configured to display vehicle information; a display extension extended downward from the display window, such that the rear cover part is inserted into the display extension; a display coupling part extended from the display extension, disposed so as to face the support part, and coupled to the support part; and a display assembling part formed on the display coupling part, and constrained by the latch part.

The display coupling part may include: a coupling plate seated on the support part; and a coupling hole formed in the coupling plate such that the support part is passed through the coupling hole.

The rear cover part may include: a rear cover plate covering the outside of the display part; a rear cover pin formed on the rear cover plate, and passed through the support part; a rear cover hook formed on the rear cover plate, and hooked and fixed to the edge of the support part; and a rear cover central part formed on the rear cover plate, and locked and fixed to the central portion of the support part.

The front cover part may include: a front cover plate covering the inside of the display part; a front cover insertion part formed on the front cover plate such that the support part is inserted into the front cover insertion part; a front cover hook formed on the front cover plate, and hooked and fixed to the support part; and a front cover pressing part formed on the front cover plate so as to constrain the latch part.

The latch part may include: a latch body rotatably mounted on the support part; a latch clip mounted on the support part so as to prevent separation of the latch body; a latch locking part extended from the latch body, and locked to the display part mounted on the support part and rotated; and a latch constraint part extended from the latch body, and pressing the top of the display part when the latch body is rotated.

The latch part may further include a latch stopper extended from the latch body, and locked to the support locking part formed on the support part so as to be restricted from rotating.

The latch part may further include a latch seating part extended from the latch constraint part such that the front cover part is seated on the latch seating part.

In the head-up display device for a vehicle in accordance with the embodiment of the present invention, the combiner may be assembled in a latch manner, and the reflecting surface and the assembling surface of the combiner may be separately disposed to prevent transfer of stress.

In the head-up display device for a vehicle in accordance with the embodiment of the present invention, since the combiner can be easily replaced when the combiner is damaged, the maintenance cost can be saved.

In the head-up display device for a vehicle in accordance with the embodiment of the present invention, the replaceable display part may be locked or unlocked by the latch part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
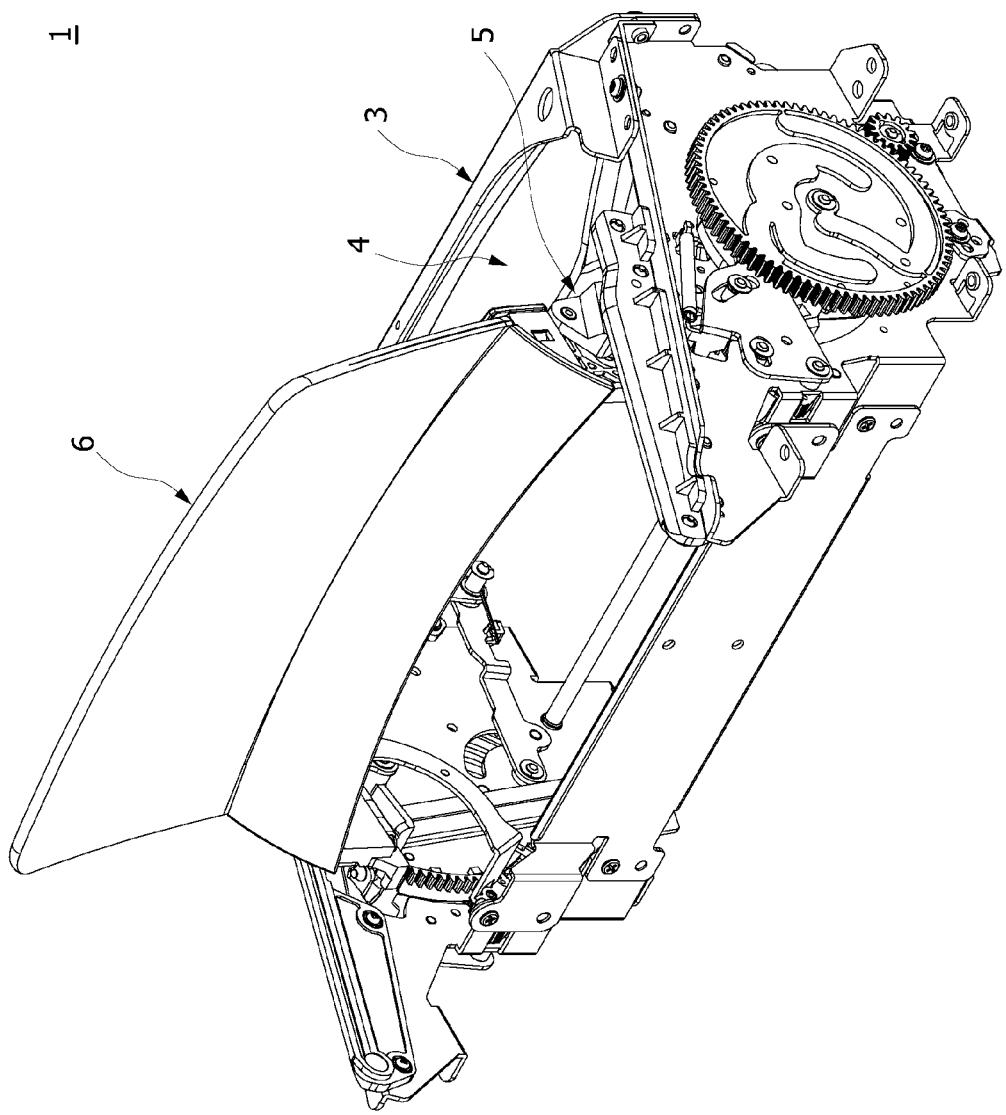
FIG. 1 is a diagram schematically illustrating a head-up display device for a vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a head-up display device for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a diagram schematically illustrating a head-up display device for a vehicle in accordance with an embodiment of the present invention. Referring to FIG. 1, the head-up display device 1 for a vehicle in accordance with the embodiment of the present invention may include a housing 3, a cover 4, a driver 5 and a combiner 6.

The housing 3 may be mounted in a vehicle. For example, the housing 3 may be disposed in an instrument panel formed in front of a driver seat.

The cover 4 may cover the entrance of the housing 3. For example, the cover 4 may open the entrance of the housing 3 when an engine is turned on, and close the entrance of the housing 3 when the engine is turned off.

The driver 5 may be mounted on the housing 3 so as to drive the combiner 6. For example, the driver 5 may expose the combiner 6 embedded in the housing 3 to the outside of the housing 3, during driving.

The combiner 6 may be coupled to the driver 5 so as to operate separately from the cover 4, and erected from the inside to the outside of the housing 3 so as to display vehicle information. The combiner 6 may be constituted by a plurality of parts which are assembled in a latch manner or snap-fit manner. The combiner 6 can be replaced. For example, when a screen for displaying vehicle information in the combiner 6 is damaged, the combiner 6 may be replaced.

Figure 2:
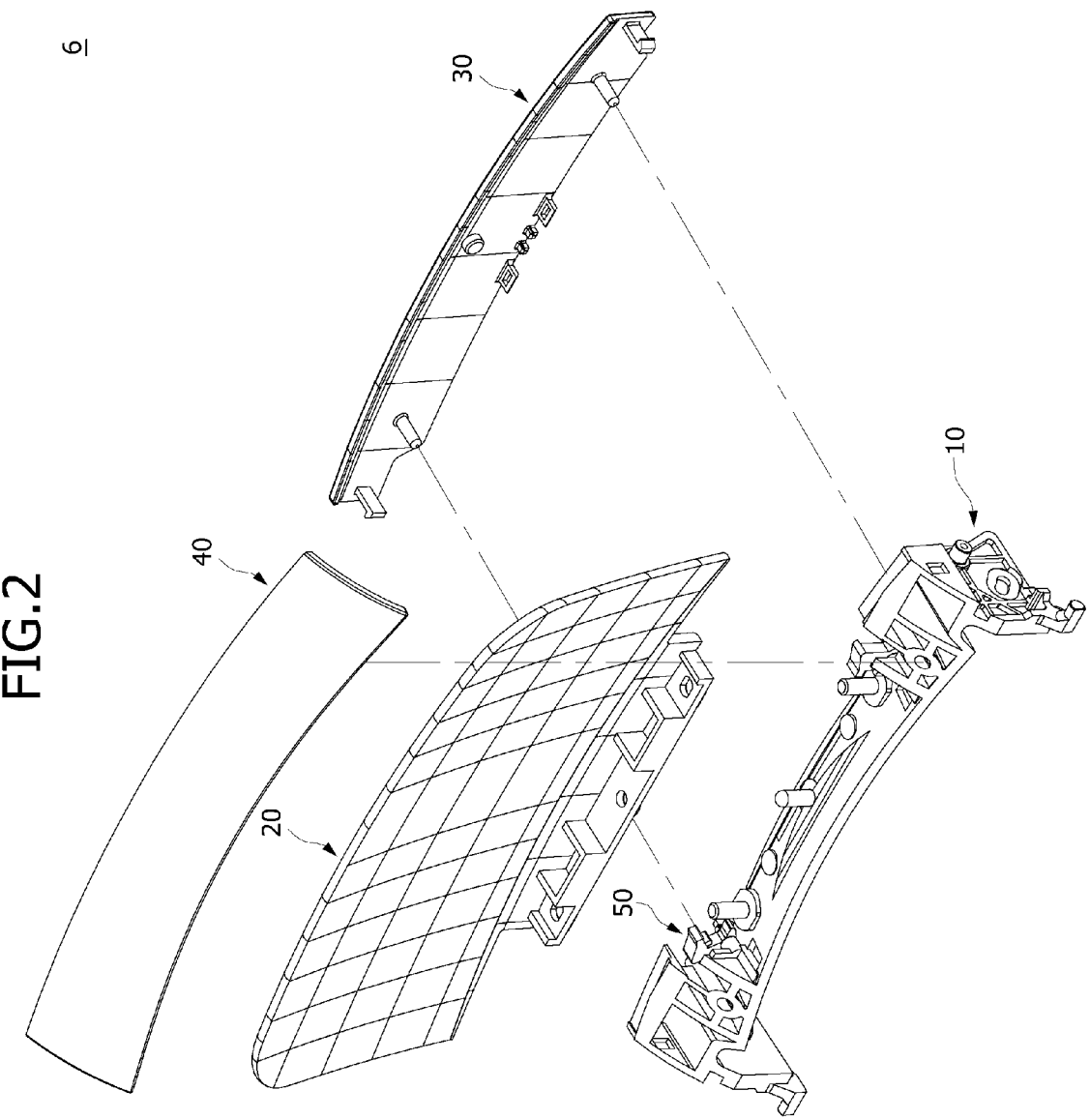
FIG. 2 is a diagram schematically illustrating a combiner which is assembled in a vertical direction in the head-up display device for a vehicle in accordance with the embodiment of the present invention.

FIG. 2 is a diagram schematically illustrating the combiner which is assembled in a vertical direction in the head-up display device for a vehicle in accordance with the embodiment of the present invention. Referring to FIGS. 1 and 2, the combiner 6 in accordance with the embodiment of the present invention may be assembled in the vertical direction, and include a support part 10, a display part 20, a rear cover part 30, a front cover part 40 and a latch part 50.

The support part 10 may be mounted on the driver 5 and driven by the driver 5, and the display part 20 may be moved downward on a line perpendicular to the support part 10, and pin-coupled to the support part 10 so as to visually display the vehicle information. The rear cover part 30 may be fastened to the support part 10 in a snap-fit manner, and cover the outside of the display part 20. The front cover part 40 may be fastened to the support part 10 in a snap-fit manner, and cover the inside of the display part 20. The latch part 50 may be rotatably mounted on the support part 10, and locked to the display part 20 to constrain the display part 20 while rotated. The display part 20 may be replaced when the constraint of the latch part 50 is removed.

For example, the display part 20 may be vertically assembled to the support part 10 mounted on the driver 5, and the rear cover part 30 and the front cover part 40 may be assembled to the front and rear of the display part 20, respectively.

Figure 3:
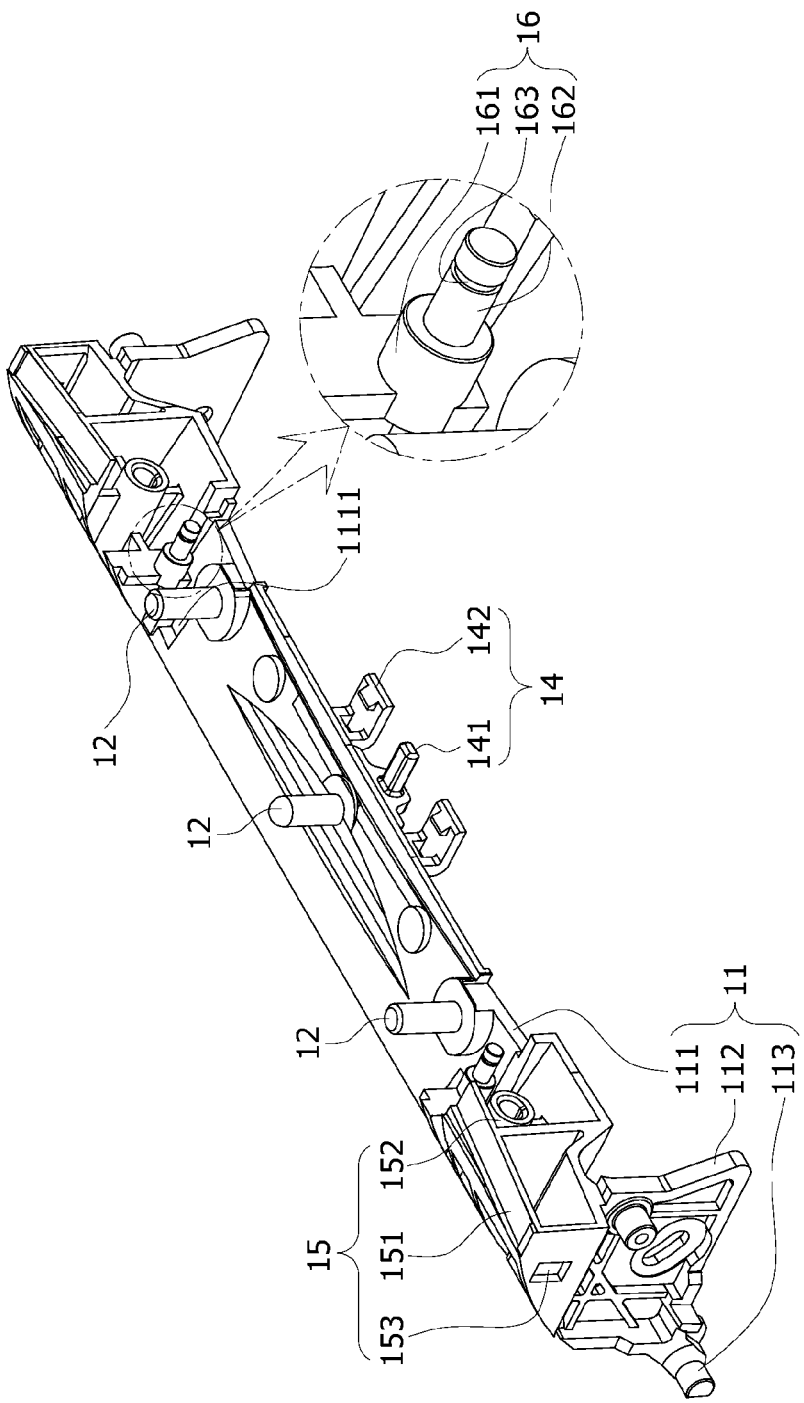
FIG. 3 is a diagram schematically illustrating a support part of FIG. 2.

FIG. 3 is a diagram schematically illustrating the support part of FIG. 2. Referring to FIG. 3, the support part 10 may include a support plate 11, a support pin 12, a support central part 14, a support side part 15 and a support shaft 16.

The support plate 11 may be connected to the driver 5. For example, the support plate 11 may include a plate base part 111 disposed across the housing 3, a plate-side support part 112 formed on either side of the plate base part 111, and a plate-side connection part 113 formed on the plate-side support part 112 and connected to the driver 5.

The support pin 12 may be formed on the support plate 11, and inserted into the front cover part 40 through the display part 20. For example, three support pins 12 may be disposed on the plate base part 111 so as to be isolated from one another.

The support central part 14 may be formed in the center of the support plate 11, and coupled to the rear cover part 30 in a snap-fit manner. For example, the support central part 14 may protrude in a direction perpendicular to the length of the plate base part 111.

The support central part 14 may include a central guide 141 and a central hook 142. The central guide 141 may be formed on the support plate 11, and protrude toward the rear cover part 30. For example, the central guide 141 may guide the installation position of the rear cover part 30. The central hook 142 may be formed on the support plate 11, and protrude toward the rear cover part 30 so as to be hooked and fixed to the rear cover part 30. For example, the central guide 141 may be disposed between the pair of central hooks 142.

The support side part 15 may be formed at either end of the support plate 11, and coupled to the rear cover part 30 in a snap-fit manner. For example, the support side part 15 may maintain the coupling state with the rear cover part 30 while supporting the rear cover part 30 at either end of the plate base part 111.

The support side part 15 may include a side body 151, a side insertion part 152 and a side locking part 153.

The side body 151 may be formed at the edge of the support plate 11. For example, the side body 151 may protrude upward from the plate base part 111, and support the rear cover part 30 through surface contact with the rear cover part 30.

The side insertion part 152 may be formed in the side body 151, and the rear cover part 30 may be inserted into the side insertion part 152. For example, the side insertion part 152 may be a groove into which the rear cover part 30 is inserted to guide the position.

The side locking part 153 may be formed in the side body 151, and the rear cover part 30 may be locked and fixed to the side locking part 153. For example, the side locking part 153 may be a hole formed at the outer surface of the side body 151.

The support shaft 16 may be formed in the support side part 15, and the latch part 50 may be rotatably mounted on the support shaft 16. For example, the support shaft 16 may include a shaft protrusion 161 protruding from a side surface of the side body 151 and having a cylindrical shape, a shaft insertion part 162 extended from the shaft protrusion 161 and having a smaller diameter than the shaft protrusion 161, and a shaft groove 163 formed in a circumferential direction at an end of the shaft insertion part 162. The latch part 50 may be inserted onto the shaft insertion part 162 and rotated.

Figure 4:
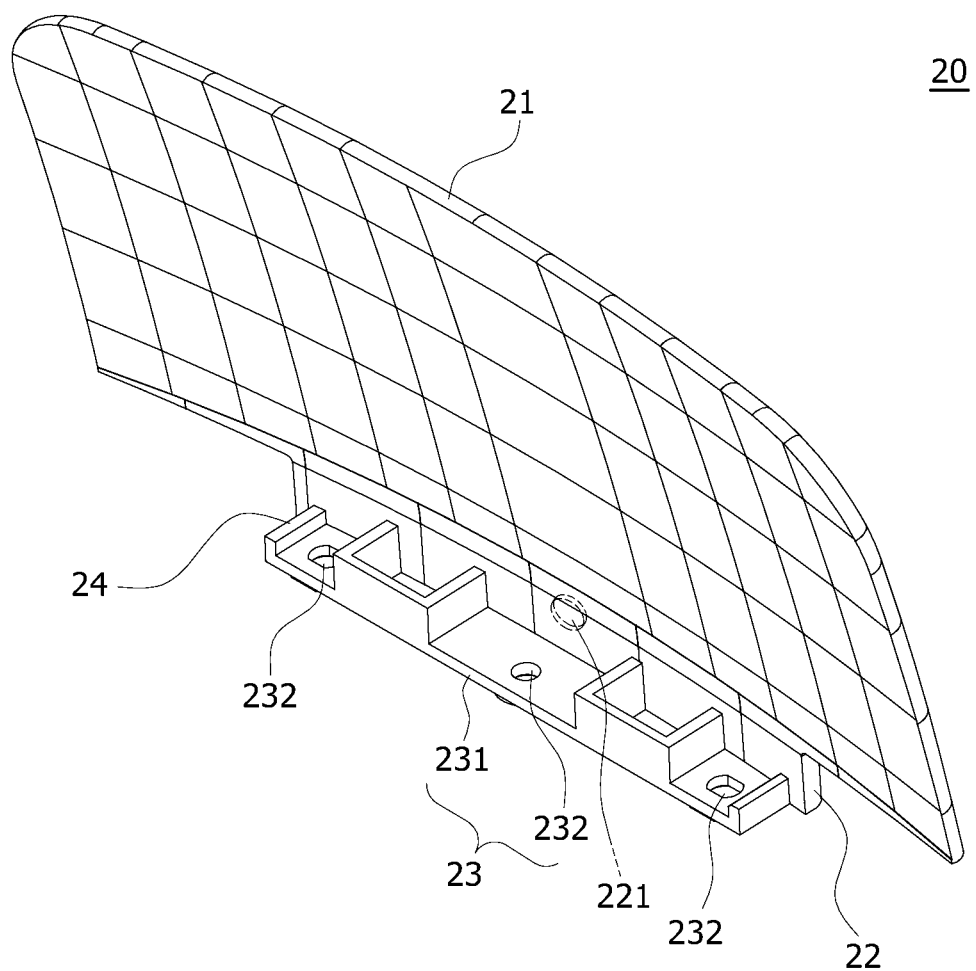
FIG. 4 is a diagram schematically illustrating a display part of FIG. 2.

FIG. 4 is a diagram schematically illustrating the display part of FIG. 2. Referring to FIG. 4, the display part 20 may include a display window 21, a display extension 22, a display coupling part 23 and a display assembling part 24.

The display window 21 may display vehicle information. The display extension 22 may be extended downward from the display window 21, and the rear cover part 30 may be inserted into the display extension 22. For example, the display extension 22 may have a smaller width than the display window 21, and have a display extension groove 221 formed at the outside thereof so as to guide the rear cover part 30.

The display coupling part 23 may be bent and extended from the display extension 22, disposed to face the support part 10, and coupled to the support part 10. The display coupling part 23 may include a coupling plate 231 and a coupling hole 232.

The coupling plate 231 may be seated on the support part 10. For example, the coupling plate 231 may be extended horizontally from the display extension 22, and disposed to face the support plate 11.

The coupling hole 232 may be formed in the coupling plate 231, and the support part 10 may be passed through the coupling hole 232. For example, the plurality of coupling holes 232 may be formed at positions corresponding to the three support pins 12, respectively, and the support pins 12 may be passed through the coupling holes 232.

The display assembling part 24 may be formed on the display coupling part 23 and constrained by the latch part 50. For example, the display assembling part 24 may protrude upward from either end of the coupling plate 231. Both ends of the coupling plate 231 may be locked to the latch part 50 so as to induce rotation of the latch part 50, and the rotated latch part 50 may press the top of the display assembling part 24 moved downward, thereby constraining the display part 20.

Figure 5:
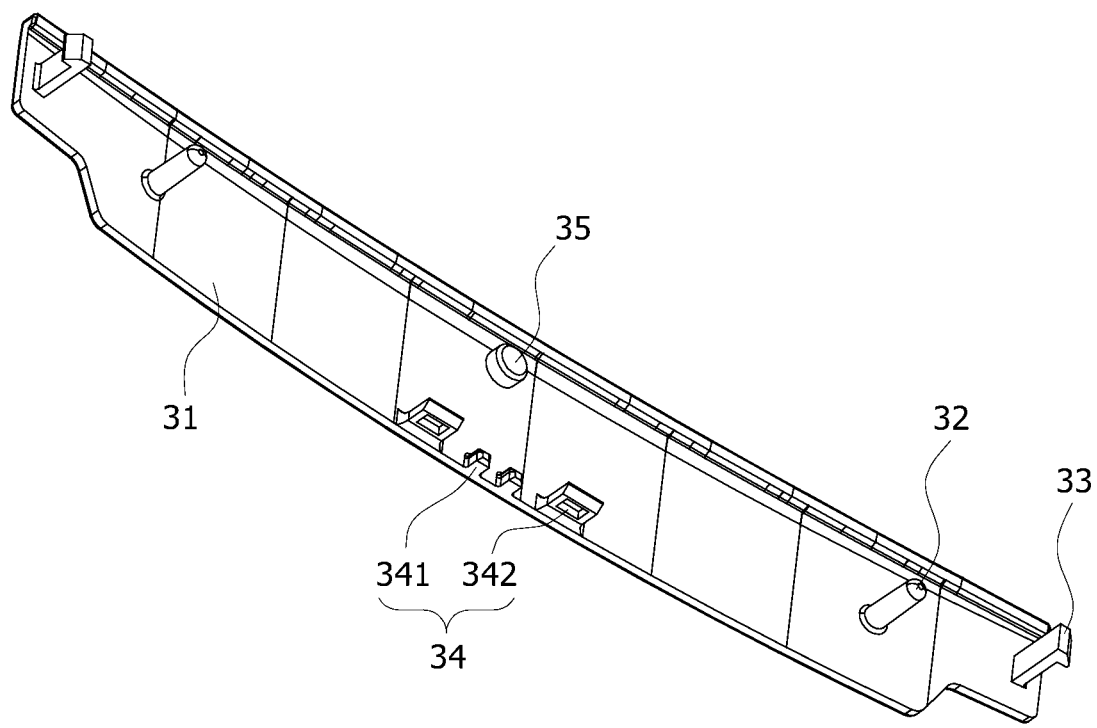
FIG. 5 is a diagram schematically illustrating a rear cover part of FIG. 2.

FIG. 5 is a diagram schematically illustrating the rear cover part of FIG. 2. Referring to FIG. 5, the rear cover part 30 in accordance with the embodiment of the present invention may include a rear cover plate 31, a rear cover pin 32, a rear cover hook 33 and a rear cover central part 34.

The rear cover plate 31 may cover the outside of the display part 20. For example, the rear cover plate 31 may cover the lower portion of the outside of the display part 20.

The rear cover pin 32 may be formed on the rear cover plate 31, and passed through the support part 10. For example, the rear cover pin 32 may be constituted by a pair of rear cover pins isolated from each other, and inserted into the side insertion part 152.

The rear cover hook 33 may be formed on the rear cover plate 31, and hooked and fixed to the edge of the support part 10. For example, the rear cover hook 33 may protrude toward the support part 10 from either end the rear cover plate 31, and be hooked and fixed to the side locking part 153.

The rear cover central part 34 may be formed in the rear cover plate 31, and locked and fixed to the central portion of the support part 10. For example, the rear cover central part 34 may include a rear cover guide part 341 and a rear cover locking part 342. The rear cover guide part 341 may be constituted by a pair of protruding rear cover guide parts, and the central guide 141 may be inserted therebetween. The rear cover locking part 342 may be constituted by a pair of rear cover locking parts disposed at both sides of the rear cover guide part 341, and the central hook 142 may be hooked and fixed to the rear cover locking part 342.

The rear cover part 30 may further include a rear cover protrusion 35. The rear cover protrusion 35 may be formed on the rear cover plate 31, and inserted into the display extension groove 221 so as to guide the assembling position.

Figure 6:
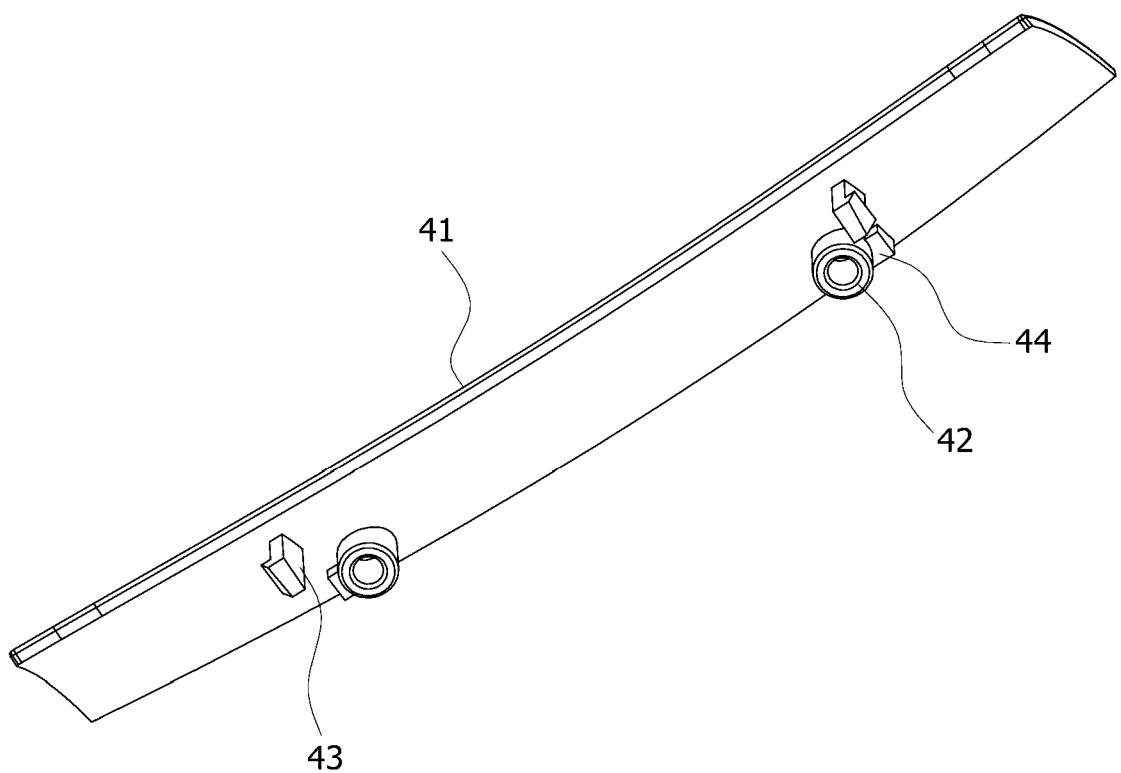
FIG. 6 is a diagram schematically illustrating a front cover part of FIG. 2.

FIG. 6 is a diagram schematically illustrating the front cover part of FIG. 2. Referring to FIG. 6, the front cover part 40 may include a front cover plate 41, a front cover insertion part 42, a front cover hook 43 and a front cover pressing part 44.

The front cover plate 41 may cover the inside of the display part 20. For example, the front cover plate 41 may be seated on a curved surface of the side body 151 so as to cover the coupling portion between the support part 10 and the display part 20.

The front cover insertion part 42 may be formed on the front cover plate 41, and the support part 10 may be inserted into the front cover insertion part 42. For example, the front cover insertion part 42 may protrude downward from the bottom surface of the front cover plate 41, and the support pins 12 may be inserted into the respective front cover insertion parts 42.

The front cover hook 43 may be formed on the front cover plate 41, and hooked and fixed to the support part 10. For example, the front cover hook 43 may protrude downward from the bottom surface of the front cover plate 41, and be hooked and fixed to the bottom surface of the support plate 11 through a plate through-hole 1111 formed in the support plate 11.

The front cover pressing part 44 may be formed on the front cover plate 41, and constrain the latch part 50. For example, the front cover pressing part 44 may be formed on the bottom surface of the front cover plate 41, seated on the latch part 50 which has completely constrained the display part 20, and prevent an unintended unlock of the latch part 50.

Figure 7:
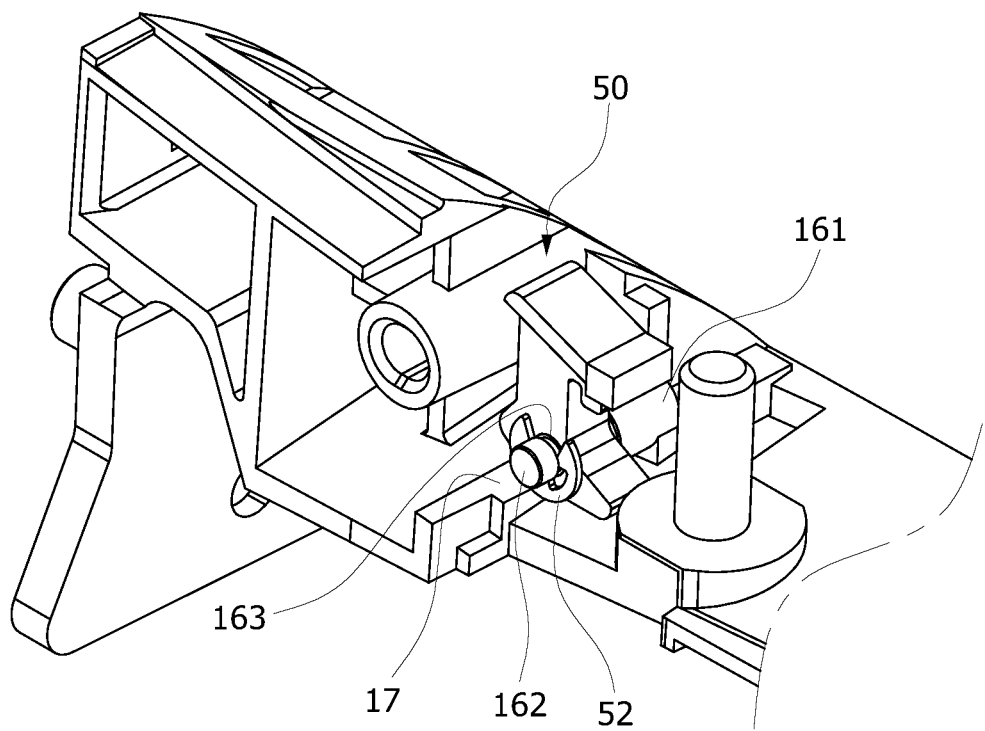
FIG. 7 is a diagram schematically illustrating a latch part of FIG. 2.
Figure 8:
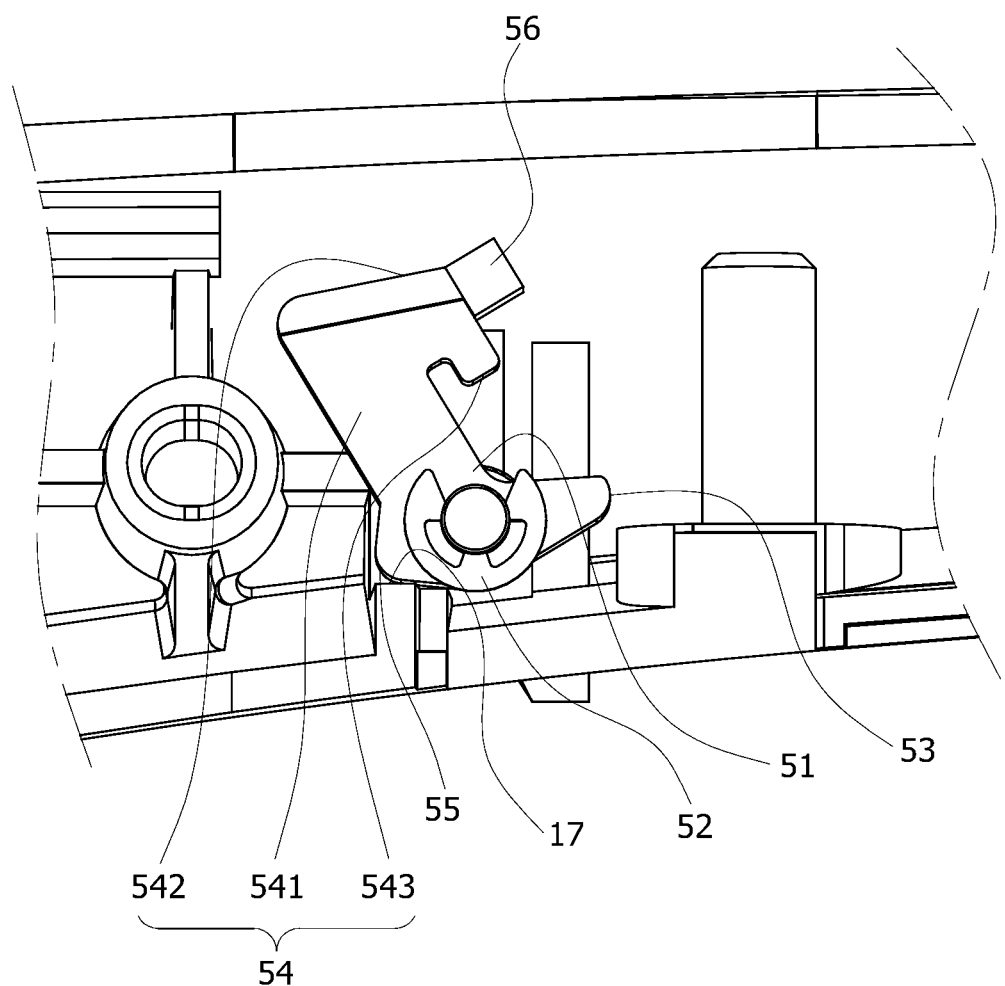
FIG. 8 is a diagram schematically illustrating the initial state of the latch part.
Figure 9:
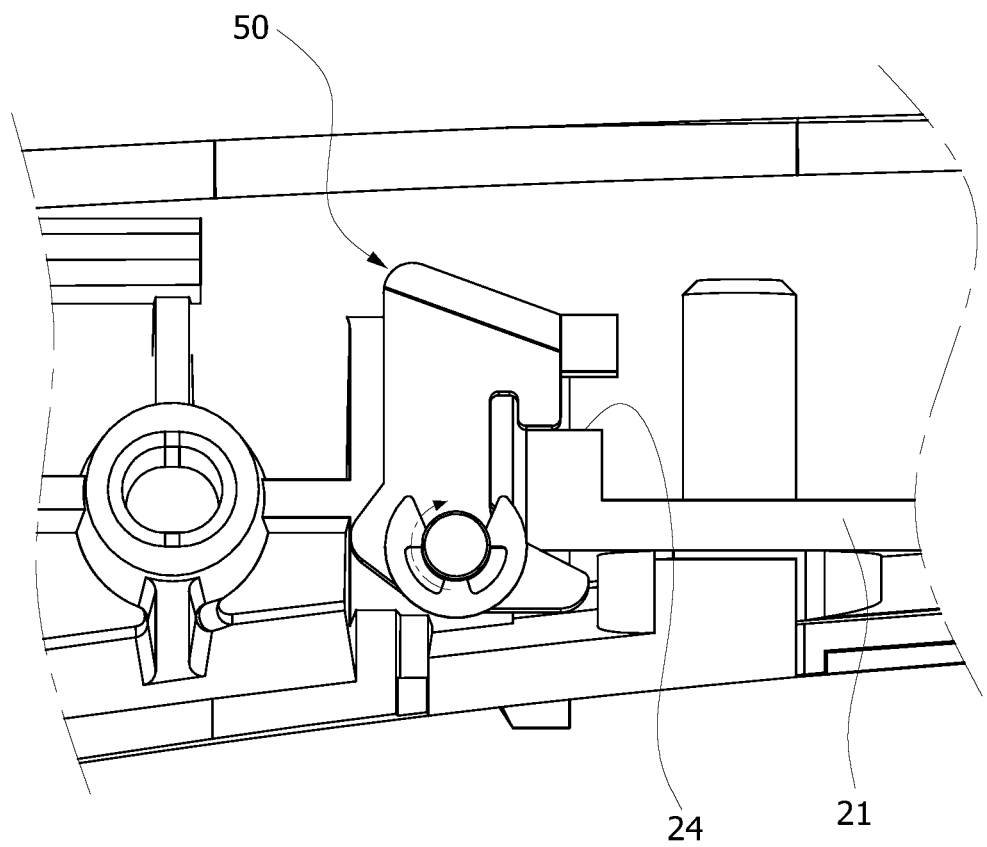
FIG. 9 is a diagram schematically illustrating that the latch part is rotated by the display part in FIG. 8.
Figure 10:
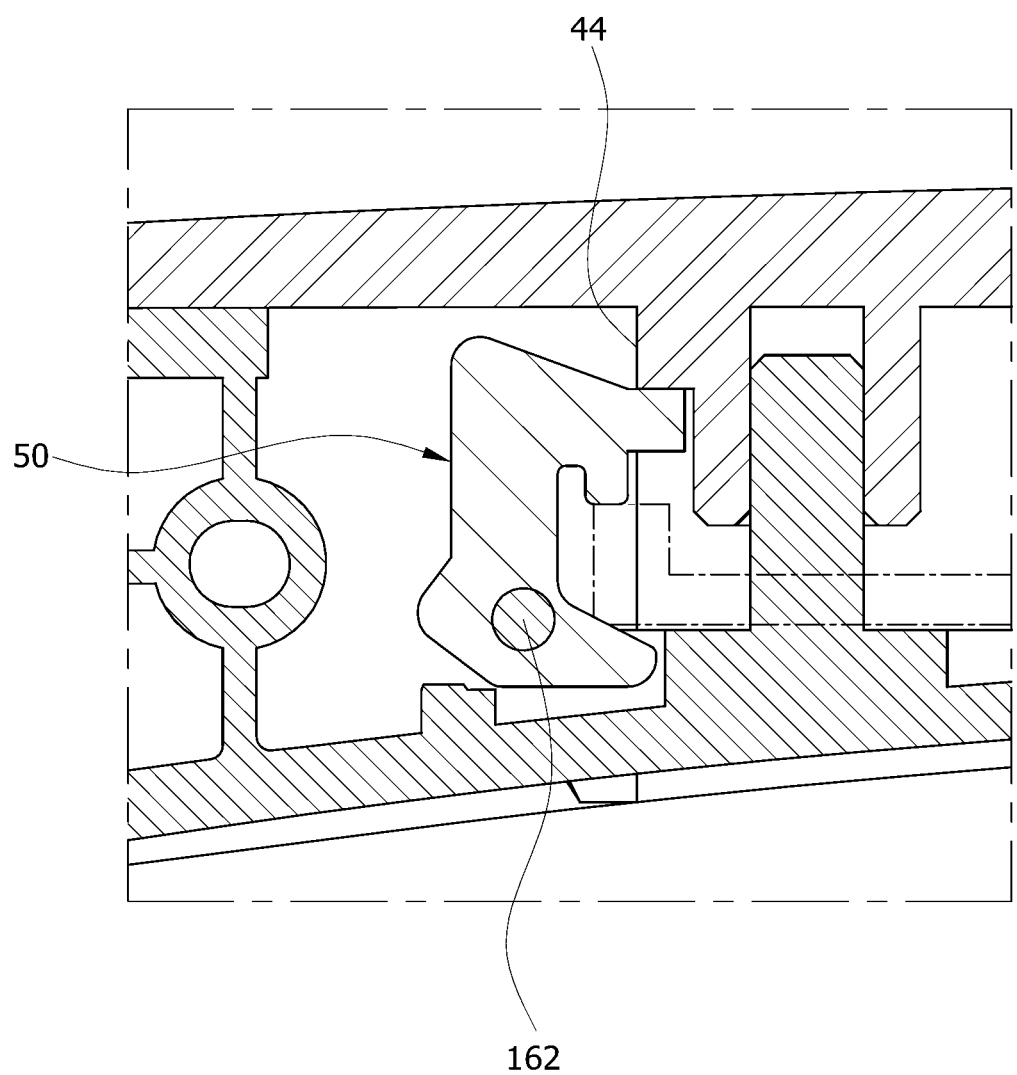
FIG. 10 is a diagram schematically illustrating that the latch part is constrained by the front cover part in FIG. 9.

FIG. 7 is a diagram schematically illustrating the latch part of FIG. 2, and FIG. 8 is a diagram schematically illustrating the initial state of the latch part. FIG. 9 is a diagram schematically illustrating that the latch part is rotated by the display part in FIG. 8, and FIG. 10 is a diagram schematically illustrating that the latch part is constrained by the front cover part in FIG. 9. Referring to FIGS. 7 to 10, the latch part 50 in accordance with the embodiment of the present invention may include a latch body 51, a latch clip 52, a latch locking part 53 and a latch constraint part 54. The latch part 50 may be constituted by a pair of latch parts isolated from each other.

The latch body 51 may be rotatably mounted on the support part 10. For example, the latch body 51 may have a hole through which the shaft insertion part 162 of the support shaft 16 is passed. Thus, the latch body 51 may be locked to the shaft protrusion 161 and restricted from moving in the axial direction, and rotated in the shaft insertion part 162.

The latch clip 52 may be mounted on the support part 10 so as to prevent separation of the latch body 51. For example, the latch clip 52 may be formed in a ring shape whose both ends are isolated from each other, and inserted into the shaft groove 163 so as to prevent separation of the latch body 51 mounted in the shaft insertion part 162.

The latch locking part 53 may be extended from the latch body 51, and locked to the display part 20 mounted on the support part 10 and rotated. For example, the latch locking part 53 may be disposed on an installation path of the coupling plate 231. When the coupling plate 231 is moved downward so as to be coupled to the support part 10, the latch locking part 53 may be rotated by pressurization of the coupling plate 231. At this time, the latch body 51 may also be rotated by the rotation of the latch locking part 53.

The latch constraint part 54 may be extended from the latch body 51, and press the top of the display part 20 when the latch body 51 is rotated. For example, the latch constraint part 54 may include a first constraint protrusion 541 extended upward from the latch body 51, a second constraint protrusion 542 extended laterally from the first constraint protrusion 541, and a third constraint protrusion 543 extended downward from the second constraint protrusion 542. When the rotation of the latch locking part 53 by the pressurization of the coupling plate 231 is completed, the third constraint protrusion 543 may constrain the display part 20 by pressing the top of the display assembling part 24.

The latch part 50 in accordance with the embodiment of the present invention may further include a latch stopper 55. The latch stopper 55 may be extended from the latch body 51, and locked to the support locking part 17 formed on the support part 10 so as to be restricted from rotating. For example, when the latch locking part 53 is disposed on the right of the latch body 51, the latch stopper 55 may be disposed on the left of the latch body 51. On the other hand, when the latch locking part 53 is disposed on the left of the latch body 51, the latch stopper 55 may be disposed on the right of the latch body 51.

The outer surface of the latch stopper 55 may be locked to the support locking part 17 protruding upward from the support plate 11, and restricted from rotating. Thus, the latch locking part 53 may be positioned on the installation path of the coupling plate 231.

The coupling plate 231 moved downward may interfere with the latch locking part 53, and not interfere with the latch constraint part 54. When the latch locking part 53 is rotated by the pressurization of the coupling plate 231, the latch constraint part 54 may be rotated to press the display assembling part 24 formed on the end of the coupling plate 231.

The latch part 50 in accordance with the embodiment of the present invention may further include a latch seating part 56. The latch seating part 56 may be extended from the latch constraint part 54, and the front cover part 40 may be seated on the latch seating part 56. For example, the latch seating part 56 may be extended laterally from the second constraint protrusion 542, and the front cover pressing part 44 may be seated on the top of the latch seating part 56 and additionally constrain the latch part 50, during the installation process of the front cover part 40.

Hereafter, an assembling process of the combiner 6 having the above-described structure will be schematically described as follows.

First, the support plate 11 may be positioned to face upward, and the display part 20 may be moved vertically downward above the support plate 11. At this time, the support pin 12 may be passed through the display part 20 so as to correct the assembling position.

When the display part 20 is locked and fixed to the support plate 11, the rear is cover part 30 may be mounted on the display part 20. At this time, the rear cover hook 33 formed at the edge of the rear cover part 30 may be locked and fixed to the side locking part 153. The central hook 142 positioned in the center of the support plate 11 may be locked and fixed to the rear cover locking part 342.

When the support part 10 and the rear cover part 30 are completely coupled to each other, the front cover part 40 may be coupled to the support part 10. The front cover part 40 may cover the coupling portion between the support part 10 and the display part 20.

When the display part 20 is coupled to the support part 10, the latch locking part 53 locked to the display part 20 may be rotated. The latch constraint part 54 interlocked with the latch locking part 53 may constrain the display part 20.

While the front cover part 40 is coupled to the support part 10, the front cover pressing part 44 may be seated on the top of the latch part 50 and additionally constrain the latch part 50.

In the head-up display device 1 for a vehicle in accordance with the embodiment of the present invention, the combiner 6 may be assembled in a latch manner, and the reflecting surface and the assembling surface of the combiner 6 may be separately disposed to prevent transfer of stress.

In the head-up display device 1 for a vehicle in accordance with the embodiment of the present invention, since the combiner 6 can be easily replaced when the combiner 6 is damaged, the maintenance cost can be saved.

In the head-up display device 1 for a vehicle in accordance with the embodiment of the present invention, the replaceable display part 20 may be locked or unlocked by the latch part 50.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A head-up display device for a vehicle, comprising:
a housing mounted in the vehicle;
a cover covering an entrance of the housing;
a driver mounted in the housing; and
a combiner coupled to the driver and configured to operate separately from the cover, erected from an inside to an outside of the housing configured to display vehicle information, and replaceably assembled in a latch manner,
wherein the combiner comprises:
a support mounted on the driver;
a display disposed on a line perpendicular to the support, and pin-coupled to the support to visually display the vehicle information; and
a latch rotatably mounted on the support, and locked to the display configured to constrain the display while rotated.

2. The head-up display device of claim 1, wherein the combiner further comprises:
a rear cover fastened to the support in a snap-fit manner, and covering an outside of the display; and
a front cover fastened to the support in a snap-fit manner, and covering an inside of the display.

3. The head-up display device of claim 2, wherein the support comprises:
a support plate connected to the driver;
one or more support pins formed on the support plate, and inserted into the front cover through the display;
a central support formed in a center of the support plate, and coupled to the rear cover in a snap-fit manner;
a side support formed at either end of the support plate, and coupled to the rear cover in a snap-fit manner; and
a support shaft formed in the side support, such that the latch is rotatably mounted on the support shaft.

4. The head-up display device of claim 3, wherein the central support comprises:
a central guide formed on the support plate and protruding toward the rear cover; and
a central hook formed on the support plate, and protruding toward the rear cover configured to be locked and fixed to the rear cover.

5. The head-up display device of claim 3, wherein the side support comprises:
a side body formed at an edge of the support plate;
a side insertion formed on the side body, such that the rear cover is inserted into the side insertion; and
a side lock formed on the side body, such that the rear cover is locked and fixed to the side locking.

6. The head-up display device of claim 2, wherein the display comprises:
a display window configured to display the vehicle information;
a display extension extended downward from the display window, such that the rear cover is inserted into the display extension;
a display coupler extended from the display extension, disposed so as to face the support, and coupled to the support; and
a display assembler formed on the display coupler, and constrained by the latch.

7. The head-up display device of claim 6, wherein the display coupler comprises:
a coupling plate seated on the support; and
a coupling hole formed in the coupling plate such that the support is passed through the coupling hole.

8. The head-up display device of claim 2, wherein the rear cover comprises:
a rear cover plate covering the outside of the display;
a rear cover pin formed on the rear cover plate, and passed through the support;
a rear cover hook formed on the rear cover plate, and hooked and fixed to an edge of the support; and
a rear central cover formed on the rear cover plate, and locked and fixed to a central portion of the support.

9. The head-up display device of claim 2, wherein the front cover comprises:
a front cover plate covering the inside of the display;

a front cover insertion formed on the front cover plate such that the support is inserted into the front cover insertion;

a front cover hook formed on the front cover plate, and hooked and fixed to the support; and a front cover presser formed on the front cover plate to constrain the latch.

10. The head-up display device of claim 2, wherein the latch comprises:

a latch body rotatably mounted on the support;

a latch clip mounted on the support configured to prevent separation of the latch body;

a latch lock extended from the latch body, and locked to the display mounted on the support and rotated; and a latch constraint extended from the latch body, and pressing the top of the display when the latch body is rotated.

11. The head-up display device of claim 10, wherein the latch further comprises a latch stopper extended from the latch body, and locked to a support lock formed on the support configured to be restricted from rotating.

12. The head-up display device of claim 10, wherein the latch further comprises a latch seat extended from the latch constraint such that the front cover is seated on the latch seat.

\* \* \* \* \*